United States Patent
Burnfield

(10) Patent No.: US 6,217,709 B1
(45) Date of Patent: Apr. 17, 2001

(54) CATIONIC STARCH/CATIONIC GALACTOMANNAN GUM BLENDS AS STRENGTH AND DRAINAGE AIDS

(75) Inventor: Keith Edward Burnfield, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/207,895

(22) Filed: Nov. 23, 1998

(51) Int. Cl.[7] .................................................... D21H 21/10
(52) U.S. Cl. .................... 162/175; 162/178; 106/205.01; 106/205.6; 106/205.7; 106/206.1; 106/215.1
(58) Field of Search .................................. 162/158, 175, 162/178; 106/205.01, 205.6, 205.7, 206.1, 215.1; 210/730, 731

(56) References Cited

U.S. PATENT DOCUMENTS

| | | |
|---|---|---|
| 3,471,362 | 10/1969 | Kent ...................................... 162/178 |
| 4,385,961 | 5/1983 | Svending et al. ..................... 162/175 |
| 4,388,150 | 6/1983 | Sunden et al. ........................ 162/175 |
| 4,755,259 | 7/1988 | Larsson ................................. 162/178 |
| 4,820,380 | 4/1989 | O'Callaghan et al. ............... 162/135 |
| 4,954,220 | 9/1990 | Rushmere ........................... 162/168.3 |
| 4,961,825 | 10/1990 | Anderson et al. .................... 162/175 |
| 5,104,487 | 4/1992 | Taggart et al. ..................... 162/168.3 |
| 5,277,764 | 1/1994 | Johansson et al. ................... 162/175 |
| 5,318,669 | 6/1994 | Dasgupta ............................. 162/164 |
| 5,338,406 | 8/1994 | Smith ................................. 162/168.2 |
| 5,338,407 | 8/1994 | Dasgupta ............................. 162/168 |
| 5,502,091 | 3/1996 | Dasgupta ............................. 524/55 |
| 5,723,023 | 3/1998 | Tsai et al. ........................... 162/175 |
| 5,859,128 | 1/1999 | Moffett ............................... 525/54.2 |

FOREIGN PATENT DOCUMENTS

WO 97/00921  9/1997  (WO) .

*Primary Examiner*—Peter Chin
(74) *Attorney, Agent, or Firm*—Martin F. Sloan; Ivan G. Szanto

(57) ABSTRACT

A composition comprising cationic starch, cationic galactomannan gum (such as cationic guar, locust bean and fenugreek gum) and acid suitable as drainage aid and strength additive in papermaking.

33 Claims, No Drawings

CATIONIC STARCH/CATIONIC GALACTOMANNAN GUM BLENDS AS STRENGTH AND DRAINAGE AIDS

BACKGROUND OF THE INVENTION

1. Field of the Invention

The present invention relates to blends of cationic starch and cationic galactomannan gum such as guar, locust bean, fenugreek gum, etc. useful as strength and drainage aids in papermaking.

2. Description of the Prior Art

Cationic starch and cationic guar gum are used effectively as strength and drainage aids by the paper industry. Typically, only one of these products is added to the wet end of the paper machine. Cationic starch is more commonly used. However, there has been reports of separate addition of these products at different points to a paper machine. Cationic starch is commonly added earlier in the process to provide strength. Cationic guar gum is added closer to the paper machine to provide drainage and fiber retention.

Up to 40 pounds of cationic starch can generally be added to obtain desired strength benefits. Cationic guar gum addition levels are usually in the 1- to 8-lb. range. Both products are supplied to paper mills in powder form. Cationic starch is typically slurried in water at 10–15% solids, subjected to high temperatures, and diluted before addition to the paper machine. High levels of starch can create problems in the process such as increased biological oxygen demand (BOD) and starch build-up, lowering starch effectiveness. Cationic guar gum must be dispersed using an eductor, and dissolved in water at low solids, typically less than 1%. High amounts of fresh water needed for making guar gum solutions are becoming more difficult to get, as paper mills are closing their water systems. Dust associated with guar-based powder are also safety hazards, which can lead to falls and respiratory problems. Cost and handling problems associated with cationic guar gum have limited its use in paper dry strength applications.

Larsson, U.S. Pat. No. 4,755,259 discloses the separate addition to the papermaking machine of cationic starch, cationic guar and colloidal silica. Larsson does not disclose the addition of a combined cationic starch cationic guar blend in the papermaking machine.

Rushmere, U.S. Pat. No. 4,927,498 discloses the separate addition to the paper machine of cationic polymer, such as either cationic starch or cationic guar gum or cationic polyacrylamide, and anionic polysilicate microgels. The cationic polymers are used interchangeably and not added together as a blend.

"Application of New Gums for Enhancing Strength and Productivity", K. E. Burnfield, TAPPI Press, Apr. 26, 1995, discloses the use of cationic guar gum added to a papermaking system which contains cationic starch in order to improve drainage of the starch containing system. The cationic guar gum and the cationic starch were added separately to the papermaking system and not as a blend.

Before the discovery of the present invention it was considered by those familiar with starch and guar gum chemistry to be difficult or nearly impossible to blend dry cationic starch and dry cationic guar gum for the purpose of adding them to the papermaking machine using conventional techniques, i.e., starch cookers.

SUMMARY OF THE INVENTION

According to the present invention there is provided a composition comprising cationic starch, cationic galactomannan gum and acid.

Further provided according to the present invention is a composition for improving the dry strength and/or drainage of paper products comprising an aqueous paper pulp slurry and a composition comprising cationic starch, cationic galactomannan gum and acid.

Still further provided according to the present invention is a process for improving the dry strength and/or drainage of paper products providing an aqueous paper pulp slurry, adding the composition comprising cationic starch, cationic galactoinannan gum and acid to the paper pulp slurry and recovering the paper product in a dry sheet form.

DETAILED DESCRIPTION OF THE INVENTION

The present invention is a blend of cationic starch, cationic galactomannan gum, (such as borated cationic guar gum), and acid. The product as a powder can be handled and put into solution using conventional starch preparation systems presently in place at paper mills. The present invention eliminates cationic guar gum solution make-up, which can be hazardous and water demanding. The invention delivers a solution of blended cationic guar gum and cationic starch to the paper machine. Surprisingly, the addition of the blended product results in paper strength improvement over addition of cationic guar gum or cationic starch alone, or cationic starch and cationic guar gum added to the machine at separate addition points. The two products have been rarely added to the same machine, and even when they were added to the same machine, they were added at different points in the process of pulp stock preparation.

Cationic guar is the most preferred cationic galactomannan gum for use in the present invention. The present invention refers to guar or cationic guar specifically in certain instances, however, the person of ordinary skill in the art will recognize that these teachings apply to galactomannan gums or cationic galactomannan gums in general.

It is known in the art that cationic guar gum and cationic starch improve drainage and strength of paper when added individually as solutions during the papermaking process. It might be expected that adding both cationic starch and cationic guar gum during the papermaking process would increase strength and drainage over either cationic starch or cationic guar gum added alone. It has surprisingly been discovered by the present invention that preblending cationic guar gum and cationic starch before addition to the paper machine increased paper strength as much as 20% above that seen with adding cationic starch and cationic guar gum separately without preblending. Another important feature of the present invention is that drainage improvements seen with separate addition of cationic starch and cationic guar gum were maintained with addition of the blend. Furthermore, it was discovered that a dry product containing the required ratios of cationic guar gum and cationic starch could be formulated such that the blend could be processed identically to starch prior to addition to the paper machine. Before the present invention viscosities encountered during the make-down of a cationic starch/cationic guar gum blend would be too high to process, resulting in costly equipment alterations and unacceptable water requirements.

The cationic galactomannan gum can be selected from the group consisting of cationic guar, locust bean and fenugreek gums, preferably the cationic galactomannan Gum is cationic guar and cationic locust bean, and most preferably it is cationic guar gum.

The cationic guar gum can be a hydroxypropyl trimethylammonium chloride guar derivative prepared by the reaction of guar gum with N-(3-chloro-2-hydroxypropyl) trimethylammonium chloride, such as Quat 188 available from Dow Chemical, Midland, Mich. The cationic guar gum can be purified cationic guar gum such as Galactasol® SP 813D or blends of cationic/anionic guar products such as AQU D-3376D or AQU D-3373D, available from Hercules Incorporated. Ratio of the hydroxypropyl trimethyl ammonium chloride moiety to guar gum saccharide unit can be 0.03 to 0.2, but preferably 0.07 to 0.15. The reaction is conducted in the presence of water and sodium hydroxide. Boron, in the form of sodium borate, boric acid, borax, or other water soluble boron containing compound, is added either before or after the reaction, but before drying of the guar product.

The cationic starch used in the present invention is quaternary amine modified starch. The starch can be a waxy maize, potato, corn, wheat or tapioca starch such as Cato® 232 from National Starch and Chemical Corporation, STA•LOK® 400 from A. E. Staley Manufacturing Corporation, Chargemaster® R430 from Grain Processing Corporation. Preferably, the cationic starch is cationic corn, potato or waxy maize starch and most preferably it is cationic corn starch. The ratio of cationic starch of cationic guar gum in the formulation can be at least about 1:1, preferably at least about 1:4 and most preferably about 1:10. This ratio can be up to about 1.20, preferably up to about 1:15.

The acid can be any acid that can reduce the pH of the final cationic guar gumicationic starch solution to about 7. For convenience, preferably the acid should be dry and in particulate form. The acid can be of any particle size but preferably such that it would go through a 4 mesh screen, most preferably through a 100 mesh screen. The preferred acids are organic acids, e.g., fumaric acid, citric acid, and other water-soluble powdered acids such as ascorbic acid, glycolic acid and lactic acid. The acid should be added at a level such that the pH of the solution of cationic starch, cationic guar and acid is at least about 7, preferably at least about 8.5. The acid level can be such that the pH of the solution is up to about 10, preferably up to about 9.5.

The composition of this invention can be made by adding dry cationic starch, cationic guar and acid separately into a blender and mixing. Alternatively any two ingredients can be added and blended followed by addition of the third. Dry blending is preferable to take full advantage of the handling benefits of the invention. The dry blend is then slurried in water in the same fashion and concentration as a papermaker would do with a currently used starch, thus eliminating problems associated with making guar gum solutions. The slurry can be batch cooked at 100° C. for 20 minutes or continuously cooked (jet cooker) at temperatures above 100° C. under pressure. Cooking procedures would be identical to those suggested by the cationic starch manufacturer for their starch. The resulting solution would be ready for addition to the paper machine, however, in practice it is typically diluted as much as 10 fold before addition.

Solution of cationic starch, prepared by the cooking process, and solution of cationic guar gum can be mixed together in the ratio (based on dry wt.) described above before addition to pulp.

Viscosities of the final solutions after cooking are the same regardless of procedure used to prepare solutions. Resulting final paper properties are also comparable.

The scope of the present invention as claimed is not intended to be limited by the following examples, which are given merely by way of illustration. All parts and percentages are by weight unless otherwise indicated.

EXAMPLE 1

A quantity of 100 grams of Galactasol SP 813D cationic guar gum and 900 grams of Chargemaster R430 cationic corn starch were placed in a blender and blended to a uniform consistency. Dry powdered fumaric acid was added in increments until a 10% solids slurry of the above blend in water had a pH of 9.5. The 10% solids slurry was kept at 50 degrees Celsius for 7 hours showing no appreciable viscosity build. The slurry was heated to 100 degrees Celsius for 20 minutes. Substantial increases in viscosity were noted.

EXAMPLE 2

Example 1 was repeated adding additional fumaric acid to reduce the pH to 8.5. No visual changes in results were observed.

EXAMPLE 3

Example 1 was repeated with further addition of fumaric acid to reduce pH to 7.5. Substantial viscosity build was noted during the hold period at 50° C. This viscosity build is related to guar solubility in the system and would interfere with the standard cooking procedure for starch.

EXAMPLE 4

Example 1 was repeated omitting the fumaric acid. The resulting viscosity of the solution was substantially lower than in Examples 1, 2, and 3 indicating the cationic guar gum did not go into solution. Formic acid was added to drop the pH to 6.0. Viscosities equal to or higher than those in Examples 1, 2, and 3 were observed.

EXAMPLE 5

Drainage studies were conducted using a vacuum assisted drainage apparatus (VADA). The drainage jar apparatus is a Whatman 12.5 cm 3-piece filter funnel fitted with 541 hardened ashless filter paper. The filter paper is dried and weighed before placing in the funnel. The funnel is placed onto a vacuum flask connected to a vacuum pump and vacuum gauge. Solutions of Chargemaster R430 cationic corn starch and Galactasol SP 813S cationic guar gum were prepared and blended together in the same ratio as in Example 1. The preblended cationic starch and cationic guar gum solution was added at a 1.1% solids level based on dry pulp basis to 500 ml of 0.2% kraft paper pulp slurry. The pulp slurry is mixed for 15 seconds with the cationic starch and cationic guar gum solution. Vacuum is pulled on the funnel before addition of the pulp slurry. The slurry is added to the funnel. The time required for the pulp slurry to drain through the filter is recorded. Drainage results are summarized in Table 1. The experiment was repeated using separate additions of cationic starch and/or cationic guar gum.

EXAMPLE 6

Experiment 5 was repeated replacing the Chargemaster R430/Galactasol 813S blended solutions with a STA•LOK® 400 cationic potato starch/Galactasol SP 813D cationic guar gum solution as prepared in Example 4.

EXAMPLE 7

Example 6 was repeated reducing starch by 25% in the blend, and adding 0.5% of blend solids based on pulp.

EXAMPLE 8

Example 5 is repeated increasing the level of cationic guar gum to 20% of the blend, and adding 1.25% of blend solids based on pulp.

EXAMPLE 9

Example 5 was repeated replacing kraft pulp with neutral sulfite semi-chemical pulp.

EXAMPLE 10

Example 5 was repeated replacing kraft pulp with old corrugated container (OCC) pulp (recycled cardboard boxes).

EXAMPLE 11

Example 10 was repeated replacing Chargemaster R430 cationic corn starch with STA•LOK 400 cationic potato starch.

EXAMPLE 12

Strength studies were conducted by preparing paper handsheet using the cationic guar gun/cationic starch blends described in Example 11. Handsheets were prepared using a dynamic handsheet mold available from Paper Chemistry Laboratory, Inc., Carmel, N.Y., and methods described in its operating manual. Accordingly, Kraft pulp was diluted to a 0.18% consistency in a 30-gallon tank. For each handsheet, two liters of pulp were removed from the 30-gallon tank and placed on a stirrer. The cationic guar gurn/cationic starch blend was added at 1.1% solids based on dry pulp weight. The pulp was added to the handsheet mold and stirred with a propeller mixer. Stirring was maintained at 1,500 rpm for 5 seconds. The stirrer was slowed to 1,000 rpm for 5 additional seconds. The stirrer was further slowed to 400 rpm before lifting the stirrer blade 1" from the wire and opening the water release valve. The handsheet was formed on a 70 mesh wire.

A vacuum was pulled on the handsheet. The technique used was to pull 20 inches Hg vacuum in the system before opening the valve to the handsheet. The valve was opened removing additional water from the sheet. When the vacuum fell to 10 inches Hg, the valve was closed. The wet handsheet was weighed and removed from the screen. The handsheet was placed between blotter paper and pressed to 1,000 lbs. The sheets were dried on a drum drier at 250° C., and placed in a desiccator. The sheets were cut into half-inch strips and subjected to Instron tensile testing at 25° C. and 50% relative humidity. Tensile strength results are summarized in Table 2.

EXAMPLE 13

Example 12 is repeated increasing the level of cationic guar gum to 20% of the blend, and adding 1.25% of blend solids based on dry pulp weight.

EXAMPLE 14

Example 12 was repeated replacing kraft pulp with unbleached kraft pulp.

EXAMPLE 15

Example 12 was repeated replacing kraft pulp with old corrugated container pulp.

EXAMPLE 16

Example 15 was repeated replacing STA•LOK® 400 cationic potato starch with Chargemaster R430 cationic corn starch.

TABLE 1

DRAINAGE IN SECONDS TO DRAIN

| | Example | | | | | | |
|---|---|---|---|---|---|---|---|
| | 5 | 6 | 7 | 8 | 9 | 10 | 11 |
| Control | 38 | 42 | 32 | 38 | 101 | 63 | 63 |
| Cationic Guar Gum | 18 | 16 | 15 | 19 | 24 | 19 | 19 |
| Cationic Starch | 26 | 17 | 21 | 26 | 76 | 33 | 14 |
| Guar and Starch | 20 | | | 19 | 23 | 15 | 14 |
| Guar/Starch Blend | 19 | 12 | 15 | 19 | 19 | 18 | 17 |

TABLE 2

TENSILE STRENGTH IN POUNDS PER SQUARE INCH TO BREAK

| | Example | | | | |
|---|---|---|---|---|---|
| | 12 | 13 | 14 | 15 | 16 |
| Control | 17.4 | 17.4 | 8.0 | 8.1 | 8.1 |
| Cationic Guar Gum | 17.5 | 16.8 | 8.0 | 8.5 | 8.5 |
| Cationic Starch | 18.2 | 18.2 | 8.0 | 9.2 | 8.3 |
| Guar and Starch | 18.4 | 19.7 | 9.2 | 9.7 | 9.6 |
| Guar/Starch Blend | 20.4 | 21.4 | 10.3 | 11.0 | 11.4 |

I claim:
1. A composition consisting essentially of:
   (a) cationic starch,
   (b) cationic galactomannan gum, and
   (c) acid
      wherein the ratio of cationic starch to cationic galactomannan gum is at least about 1:1, and wherein the amount of acid is such that the pH of an aqueous solution of the composition is at least about 7.
2. The composition of claim 1 wherein the cationic starch is selected from the group consisting of cationic waxy maize, potato, corn, wheat and tapioca starch.
3. The composition of claim 1 wherein the cationic galactomannan gum is selected from the group consisting of cationic guar, locust bean, and fenugreek gum.
4. The composition of claim 1 wherein the acid is water-soluble acid in particulate form.
5. The composition of claim 1 wherein the ratio of cationic galactomannan gum to cationic starch is up to about 1:20.
6. The composition of claim 1 wherein the amount of acid is such that an aqueous solution of the composition has a pH of at least about 7.
7. The composition of claim 1 wherein the amount of acid is such that an aqueous solution of the composition has a pH of up to about 10.
8. The composition of claim 2 wherein the cationic galactomannan gum is selected from the group consisting of guar, locust bean and fenugreek gum, the acid is water-soluble acid in particulate form, the ratio of cationic galactomannan gum to cationic starch is from about 1:1 to about 1:20, and the amount of acid is such than an aqueous solution of the composition has a pH of from about 7 to about 10.
9. The composition of claim 8 wherein the cationic starch is selected from the group consisting of cationic corn, potato and waxy maize starch.
10. The composition of claim 8 wherein the cationic galactomannan gum is selected from the group consisting of cationic guar and locust bean gum.
11. The composition of claim 8 wherein the acid is dry organic acid.

12. The composition of claim 8 wherein the ratio of cationic galactomannan gum to cationic starch is at least about 1:4.

13. The composition of claim 8 wherein the ratio of cationic galactomannan gum to cationic starch is up to about 1:15.

14. The composition of claim 8 wherein the amount of acid is such that an aqueous solution of the composition has a pH of at least about 8.5.

15. The composition of claim 8 wherein the amount of acid is such that an aqueous solution of the composition has a pH of up to about 9.5.

16. The composition of claim 9 wherein the cationic galactomannan gum is selected from the group consisting of cationic guar and locust bean gum, the acid is dry organic acid, the ratio of cationic galactomannan gum to cationic starch is from about 1:4 to about 1:15 and the amount of acid is such that an aqueous solution of the composition has a pH of from about 8.5 to about 9.5.

17. The composition of claim 16 wherein the cationic starch is cationic corn starch.

18. The composition of claim 16 wherein the cationic galactomannan gum is cationic guar gum.

19. The composition of claim 16 wherein the acid is fumaric acid.

20. The composition of claim 16 wherein the ratio of cationic galactomannan gum to cationic starch is about 1:10.

21. The composition of claim 17 wherein the cationic galactomannan gum is cationic guar gum, the acid is fumaric acid, and the ratio of cationic galactomannan gum to cationic starch is about 1:10.

22. The composition of claim 1 in particulate form.

23. The composition of claim 1 in solution.

24. A composition for improving the dry strength and/or drainage of paper products comprising an aqueous paper pulp slurry and the composition of claim 1.

25. A composition for improving the dry strength and/or drainage of paper products comprising an aqueous paper pulp slurry and the composition of claim 16.

26. A composition for improving the dry strength and/or drainage of paper products comprising an aqueous paper pulp slurry and the composition of claim 21.

27. A process for improving the dry strength and/or drainage of paper products comprising:
(1) providing an aqueous paper pulp slurry,
(2) adding to the paper slurry a composition consisting essentially of:
(a) cationic starch,
(b) cationic galactomannan gum, and
(c) acid
wherein the ratio of cationic starch to cationic galactomannan gum is at least about 1:1, and wherein the amount of acid is such that the pH of an aqueous solution of the composition is at least about 7, and
(3) recovering the paper in a dry sheet form.

28. A process for improving the dry strength and/or drainage of paper products comprising:
(1) making an aqueous slurry of a composition consisting essentially of:
(a) cationic starch,
(b) cationic galactomannan gum, and
(c) acid
wherein the ratio of cationic starch to cationic galactomannan gum is at least about 1:1, and wherein the amount of acid is such that the pH of an aqueous solution of the composition is at least about 7,
(2) heating the aqueous slurry for a sufficient time at a sufficient temperature to dissolve said composition,
(3) providing an aqueous paper pulp slurry,
(4) adding the dissolved composition to the aqueous paper pulp slurry, and
(5) recovering the paper in a dry sheet form.

29. The process of claim 27 wherein the paper product is recovered by:
(1) filtering the aqueous paper pulp slurry to form a paper web, and
(2) drying the paper web to form the paper product.

30. The composition of claim 8 wherein the acid is selected from the group consisting of fumaric acid, citric acid, ascorbic acid, glycolic acid and lactic acid.

31. The composition of claim 16 wherein the acid is selected from the group consisting of fumaric acid, citric acid, ascorbic acid, glycolic acid and lactic acid.

32. The process of claim 28 wherein the cationic galactomannan gum is selected from the group consisting of cationic guar and locust bean gum, the acid is dry organic acid, the ratio of cationic starch to cationic galactomannan is from about 4:1 to about 15:1, and the amount of acid is such that an aqueous solution of the composition has a pH of from about 8.5 to about 9.5.

33. The process of claim 28 wherein the cationic starch is cationic corn starch, the cationic galactomannan gum is cationic guar gum, the acid is fumaric acid, and the ratio of cationic starch to cationic galactomannan gum is about 10:1.

* * * * *